United States Patent

[11] 3,624,282

[72] Inventors Roy G. Salaman; John B. Picchiottino, both of Boulder, Colo.

[21] Appl. No. 64,096
[22] Filed July 28, 1970
[45] Patented Nov. 30, 1971
[73] Assignee Phonocopy, Inc. Wilmington, Del.
Continuation of application Ser. No. 579,591, Sept. 15, 1966. This application July 28, 1970, Ser. No. 64,096

[54] BINARY FACSIMILE SYSTEM
10 Claims, 4 Drawing Figs.

[52] U.S. Cl. ........ 178/6, 179/2 DP, 325/65
[51] Int. Cl. ........ H04n 7/00
[50] Field of Search ........ 178/6, 6.6, 6.6 A, 6.8; 179/2 DP, 15.55 R; 325/65

[56] References Cited

UNITED STATES PATENTS

| | | | |
|---|---|---|---|
| 3,313,884 | 4/1967 | Hackenberg et al. .......... | 178/6.6 |
| 3,453,383 | 7/1969 | Schafer ........ | 178/DIG. 3 |

*Primary Examiner*—Benedict V. Safourek
*Assistant Examiner*—Albert J. Mayer
*Attorney*—Chittick, Pfund, Birch, Samuels & Gauthier

ABSTRACT: A binary-facsimile system which operates by converting the photoelectric analog scan signal to a binary signal the two levels of which represent the black and white data in the portions of the sheet being scanned. The binary signal is processed for partial response transmission and vestigal sideband amplitude modulated on a carrier for transmission in the switched telephone network to obtain increased rate of information transmissions for a given channel bandwidth. The receiver receives the binary signal and prints black or white data in accordance with the binary signal level to form a facsimile reproduction of the original sheet scanned.

INVENTOR.
ROY G. SALAMAN
JOHN B. PICCHIOTTINO
BY
Russell, Chittick & Pfund

INVENTOR.
ROY G. SALAMAN
BY JOHN B. PICCHIOTTINO
Russell, Chittick & Pfund

INVENTOR.
ROY G. SALAMAN
JOHN B. PICCHIOTTINO
BY
Russell. Chittick + Pfund

BINARY FACSIMILE SYSTEM

This is a continuation of Ser. No. 579,591 filed Sept. 15, 1966

This invention relates generally to facsimile systems and apparatus and more particularly to an improved facsimile system that utilizes binary signalling to obtain improved performance with respect to resolution and signal-to-noise ratio when the system is used in conjunction with a narrow communications channel.

A wide variety of facsimile systems have been provided in the prior art with a wide range of capabilities respecting the resolution obtainable and the speed of transmission with which they operate. In general these systems of the prior art have attempted to obtain a faithful reproduction of the original copy material that is scanned at the sending station with the result that the analog nature of the scan signal has been preserved in the modulated signal which is transmitted over the communications link between the sending and receiving stations. At the receiving station this analog signal is recovered and applied to some form of printer which generally has a capability for reproducing a grey scale so that the half tone range of the facsimile replica of the original copy is more or less equivalent to the original copy. While it is entirely possible to digitally encode the analog signal and transmit the information digitally in such prior systems and, in fact, in cryptographic systems such digital encoding has been resorted to for the purpose of security, it is apparent that such systems require relatively wide band channels since the information in the analog signal when converted to digital form produces a signal which requires considerable bandwidth if reasonable transmission times are to be employed.

The present invention has for its principle object the processing of scanned visual copy signals directly into a binary signal bit stream which permits the coding and transmission techniques for maximal utilization of a narrow band channel to be employed with reception of the facsimile-binary-type signals utilized in a black on white printer that does not produce half tones. Such a system is uniquely adapted for scanning typewritten and other printed copy and similar line drawings and charts without the necessity for half tone fidelity and transmitting such copy over an ordinary switched dialed telephone connection which is a very narrow band channel and to accomplish such transmission in a reasonable time so that a full page of copy can be transmitted in the order of 4 minutes thereby making the system well adapted for ordinary commercial use between telephone subscribers on a regular dialed telephone connection.

Further features of the invention include the utilization of a binary clock oscillator frequency for deriving synchronization signals for the scanner using a phase-locked loop in the receiver station to assure scanning phase synchronization between the transmitter and receiver.

A further feature of the invention comprises the coupling to the telephone instrument which permits the facsimile system to be used with dialed network-telephone systems and in this respect provides a unique magnetic coupling to the earpiece of the telephone for both transmission and reception thereby eliminating any distortion or other difficulties generally associated with acoustic coupling to the telephone instrument.

Other features and advantages of the invention will become apparent from the following detailed description taken in conjunction with the accompanying drawings wherein.

Figure 2:
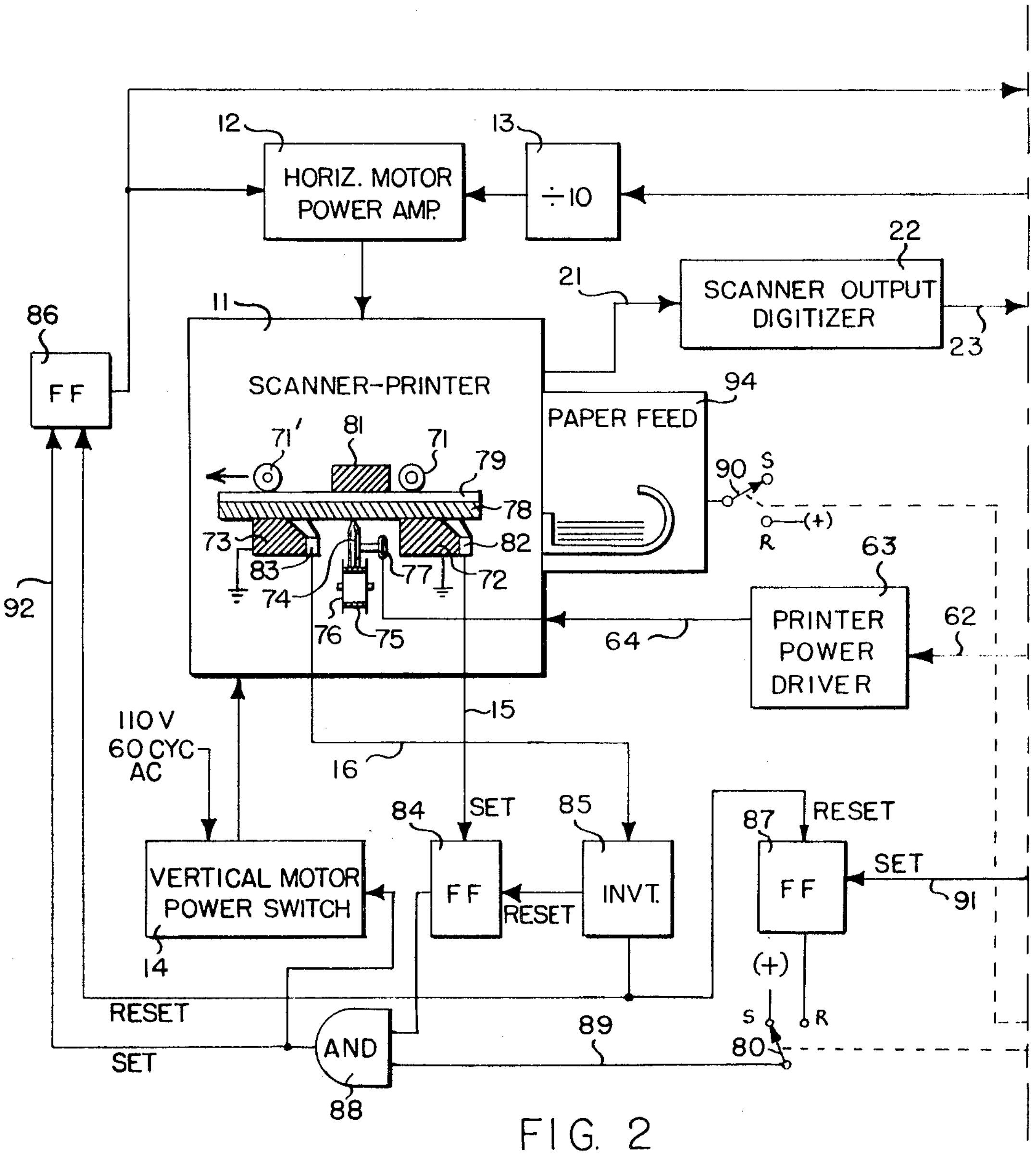
FIG. 2 is a block diagram of a scanner-printer and associated controls for a station.
Figure 1:
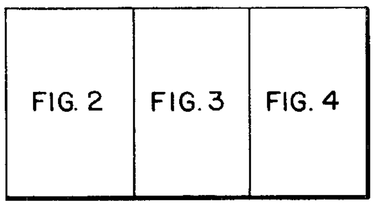
FIG. 1 shows the arrangement of FIGS. 2, 3 and 4 to obtain a diagram of a complete send-receive station.
Figure 3:
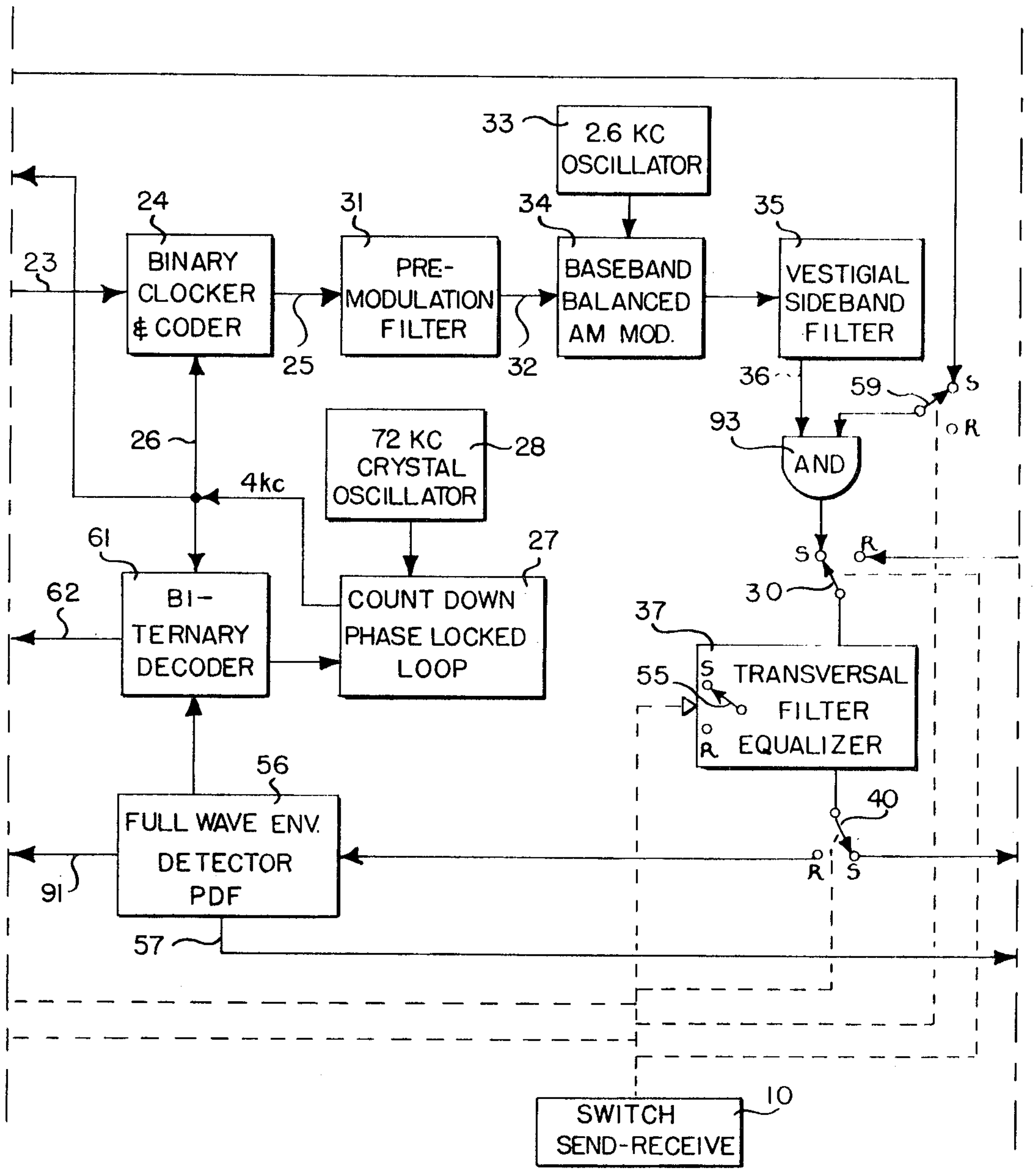
FIG. 3 is a block diagram of a modem in accordance with the invention.
Figure 4:
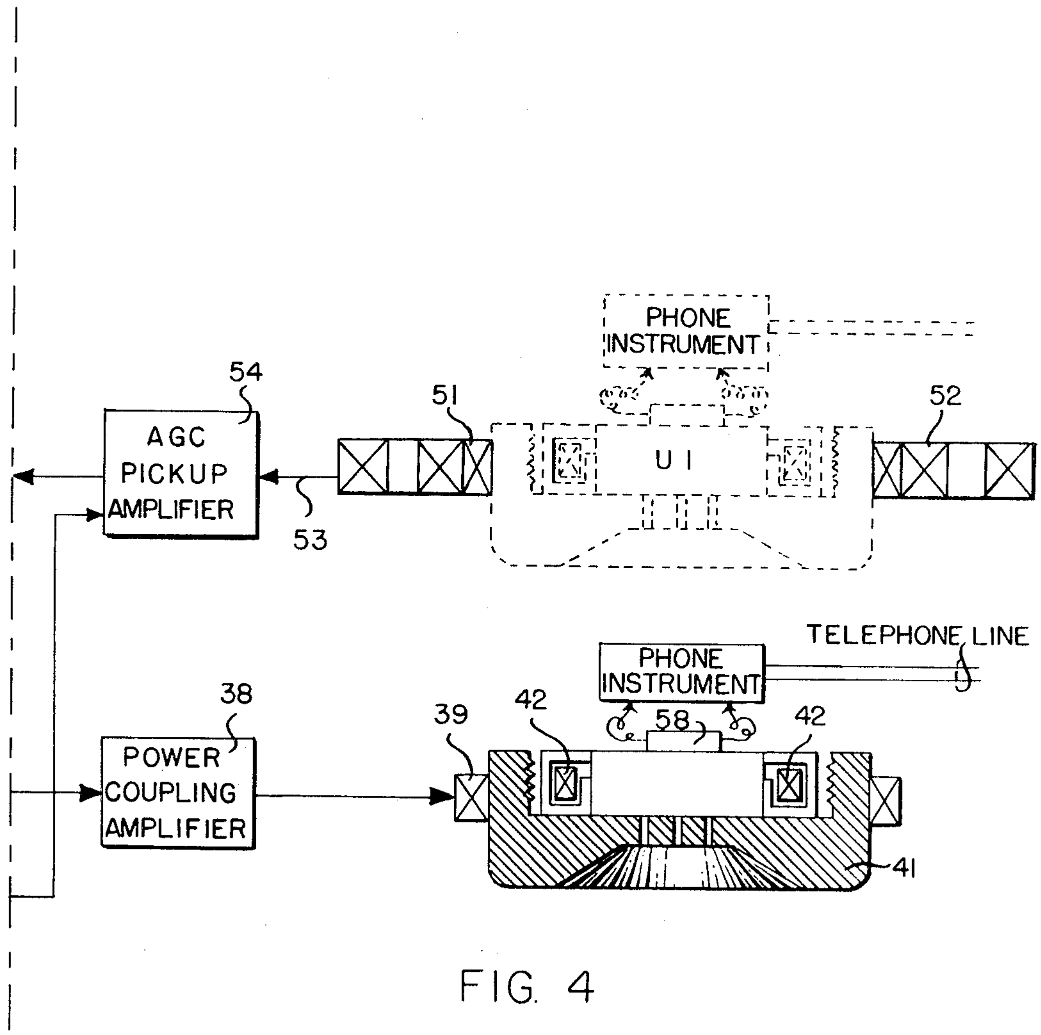
FIG. 4 is a sectional representation of a coupling arrangement for coupling to the earpiece of a telephone instrument.

The description of the invention will proceed with reference to FIGS. 2, 3 and 4 assembled as indicated in FIG. 1 into a block diagram of a complete station such as will be used at each subscriber's location to constitute either a transmitting or receiving station as desired whenever a like equipped subscriber is to be interconnected by means of the dial switched telephone network. Although this application of the invention is the one of primary interest it will be apparent that the features of the invention are not limited to systems which couple directly to the telephone instrument but can be applied to other communications channels either as a combined transmit-receive unit or a separate unit for transmission and reception, as desired.

Referring now to FIG. 2 a scanner printer 11 is arranged to feed sheets of paper past a scan line position at a predetermined rate under the control of a vertical drive motor not shown. The scanner printer 11 is preferably of the type disclosed and claimed in the application of Salaman et al., Ser. No. 579,584, U.S. Pat. No. 3,502,814, filed of even date herewith and entitled Facsimile Scanner-Printer. The scan line position is repetitively transversed by a scanning head which can provide for photoelectric scanning of the sheet passing through the scanner printer 11 to pick up an analog signal according to the changes in reflective character on the surface of the sheet for transmission or can be arranged to print on a sheet in accordance with the facsimile signals applied to the scanner printer 11 during reception. For this purpose the traverse of the scanning head at the scan line position is controlled by a horizontal scanning motor which operates in response to the control from a horizontal motor power amplifier 12 which is fed with a 400 cycle per second frequency from a frequency divider unit 13. The divider 13 receives 4 kilocycle frequency from the modem unit of FIG. 3 as will be subsequently explained. The control of the vertical drive motor is through a control switching device 14.

The operation of the scanner printer 11 for the transmission mode will be described and subsequently after the modem description has indicated the source of various control signals the reminder of the operation of the scanner printer 11 will be presented. For transmission mode the scanner printer 11 is placed into operation by the insertion of a sheet of copy which is to be transmitted by the device. The insertion of such sheet closes a switch 82 to provide a signal on line 15 indicating the presence of the paper in the feed system. The signal on line 15 is applied to set a flip-flop 84 which controls through AND 88 the vertical power switch 14 to start the vertical drive motor operating. The scanner printer 11 of the aforementioned Salaman et al. application combines the scanning and printing functions in one scanning head and thus simplifies the problem of synchronization at the transmitting and receiving stations since the drive motors, mass and moments or inertia at each station are identical.

The photoelectric analog signal produced by the scanner in unit 11 appears on line 21 and passes through a digitizer 22 or quantizer which converts the analog signal on line 21 into a two-level binary signal on line 23. The digitizer 22 can be selected from known forms of devices but the preferred form is shown in the copending application of Salaman, Ser. No. 579,590, filed Sept. 15, 1966, now U.S. Pat. No. 3,500,073 entitled "Analog to Binary Signal Processor." The digitizer 22 of the aforementioned Salaman application provides unusual ability in following the fluctuations in the analog signal on line 21 which fluctuations are not due to transitions from black to white in the copy being scanned. Such fluctuations are inherent to a certain degree in all scanners and in the particular scanner disclosed in the Salaman et al. application have been found to be pronounced due to the critical focusing of the optical system that is contained within the moving scanning head. The circuit 22 however removes these fluctuations in the base line and produces on line 23 a simple two-level binary signal having one of two levels which levels represent white or black respectively in accordance with whether the scanning head is traversing a white portion of the copy sheet or a portion on which a black letter appears.

With all extraneous fluctuations eliminated from the signal on line 23 and only representations of the portions which are black and portions which are white conveyed by the pure binary signal, the possibility for economy of bandwidth and improved signalito-noise performance is available. In the preferred embodiment this is achieved by means of biternary or partial response transmission as taught, for example, by Ringlehaan and Kretzmer hereinafter cited. As stated in the Ringelhaan U.S. Pat. No. 3,162,724, column 1, lines 56–61 "...biternary transmission techniques permit the effective binary information rate to be doubled... relative to conventional systems used to transmit binary information." For example the existing telephone system in the United States has a bandwidth of approximately 2,000 Hz. and the maximum bit rate for conventional binary transmission on such lines would be approximately 2,000 bits per second. For this purpose the ordinary binary signal on line 23 is converted into a clocked binary signal on line 25 having a clock frequency of 4 kilocycles per second applied on line 26 as a submultiple frequency from a count down circuit 27 which is fed with a precision 72 kilocycle per second frequency from a precision crystal oscillator 28.

The coder 24 corresponds with the coder shown in the U.S. Pat. to Ringelhaan No. 3,162,724 in which the clock on line 26 and the binary input on line 23 are supplied to an AND-circuit with the output applied to a flip-flop that changes state whenever the AND produces an output. Thus the ordinary binary wave on line 23 is converted to be on line 25 a wave which changes state whenever the clock pulse time finds that one level of the binary signal on line 23 exists and does not change state when the other level of the signal on line 23 exists.

The binary signal on line 25 is converted into a biternary signal on line 32 by premodulation filter 31 which may for example be a phase corrected 7-pole Butterworth filter having its cutoff frequency at 1.4 kc. In order to accommodate the biternary signal on line 32 for transmission over a narrow band telephone line which essentially is limited to a bandwidth of 2,000 cycles, the biternary signal on line 32 is impressed on a 2.6 kc. carrier from an oscillator 33 in a baseband balanced amplitude modulator 34. This modulation technique inverts and shifts the spectrum and after passing through a vestigial sideband filter 35 (which may, for example, be a 9-pole Butterworth low-pass filter having a cutoff frequency of 2.4 kc.) an output signal is obtained on line 36 which is the vestigially filtered double sideband signal from the modulator 34. By this technique the high-frequency components of the modulation signal are translated to the low-frequency portion of the sideband thereby utilizing the most favorable portion of the telephone band for the signal spectrum.

The signal on line 36 is passed through AND 93 to a transversal filter 37. The transversal filter 37 is switched between a transmission and a reception response characteristic by means of internal switching indicated at 55 and is switched between the transmission signal path and the received signal path by the switches 30, 40. The transversal filter 37 is of known design and provides a transfer function to equalize the amplitude and phase distortion for the signal path in the unit due to the various circuits previously described and further provides corrections for similar distortions that occur in the receiving channel of the equipment. The signal from the transversal filter 37 is amplified in a power amplifier 38 to a suitable level for supplying the driving current to a coupling coil 39.

The coupling coil 39 is especially adapted to the U1 earpiece of a standard telephone handset manufactured by Western Electric Co. for the American Telephone and Telegraph Co. as indicated at 41. For this purpose the coil 39 may consist of 50 turns of No. 26 wire wound on a form so that it will fit around to the periphery of the earpiece 41 in the general vicinity of the magnetic coil 42 of the U1 earpiece. It has been found that for this arrangement the coil 39 is inductively coupled to the U1 earpiece coil 42 within the structure of the earpiece 41 and is an effective means for coupling signals to the telephone line. The amplitude of signal that can be coupled to the telephone line in this manner is limited by the varistors 58 which are connected across the coil of the U1 earpiece to limit the maximum peak power that can be audibly reproduced by the earpiece. This amplitude signal has been found to be adequate for the purpose of coupling facsimile signals to the telephone line. With this arrangement all the problems of reverberation, poor frequency response, and variable coupling that are inherent in acoustic coupling to the mouthpiece of the telephone handset are avoided and substantially better results are obtained since the well-known limitations of two coupled acoustic transducers are eliminated from the coupling circuit.

In operation of the device the equipment is coupled to a telephone line as shown in FIG. 4 and the desired receiver is selected by the ordinary dial process. Located at the receiving station is a substantially identical unit to that shown in the drawings which is used to convert the telephone line facsimile signals into a printed copy facsimile of the original transmitted copy as presently described.

For reception the equipment shown in the drawings is switched to receiving mode by changing all switches 30, 40, 55, 59, 80, and 90 from the S contact to the R contact. The earpiece of the telephone handset is also placed in the center of a receiving pickup coil 51 as indicated in the alternate position shown in FIG. 4. The pickup coil 51 is associated with a special hum-bucking coil 52 with the coils 51 and 52 connected in opposition for external fields but in aiding condition for the signals coupled from the U1 earpiece. The details of this hum-bucking coil arrangement are disclosed in the application of Picchiottino, Ser. No. 579,589, filed Sept. 15, 1966, now U.S. Pat. No. 3,491,216, entitled "Hum-bucking Coupling Device."

The signals from coils 51 and 52 are applied on line 53 to an automatic gain-controlled amplifier 54 and then through transversal filter 37 which has been switched by means of switches 30, 40, 55 actuated by a send-receive switch actuator 10 to provide the desired transfer characteristic and connect it in the receiver line from amplifier 54 to a full wave envelope detector 56. The transfer function of the transversal filter 37 in the receiving mode provides an amplitude and phase correction for the corresponding amplitude and phase distortion caused by the telephone line and the coupling means used to couple signals to and from the telephone lines as well as various other distortions not otherwise compensated for in the transmitting mode transversal filter. The output of the detector 56 supplies AGC control voltage on line 57 for the amplifier 54 and a presence of carrier signal on line 91 which is applied to an OR-circuit 87.

The detector 56 includes a post detection filter (for example UTC-type LMI 2500) having a low-pass characteristic 3 db. or more down at 2,500 c.p.s. which applies the detected ternary envelope or three level signal wave to a biternary decoder 61. This ternary wave corresponds generally with the ternary signal on line 32 of the transmitter. The decoder 61 utilizes logic to recover from the ternary signal the binary signal corresponding to the original binary signal on line 23 of the transmitter. This output on line 62 is thus the desired black and white information. The arrangement for both the precoding provided by the circuit 24 in transmission and the decoding to recover the original binary signal are discussed by Kretzmer in an article entitled "Binary Data Communication by Partial Response Transmission," published in the Conference Record of IEEE Annual Communications Convention; June 7–9, 1965; pages 451–455. The decoded binary signal is compared with the local 4 kc. wave on line 26 and an error signal is applied to the unit 27 to phase lock the locally generated 4 kc. wave with the incoming data.

The ordinary binary signal representing black and white is applied to a power amplifier 63 which drives the printing section of the unit 11 by means of current impulses on line 64. Since only black and white information appears on line 64 the printer in unit 11 is preferably one which prints either all black or all white without any grey scale. Some facsimile reproducers when supplied facsimile a binary signal of this type are capable of producing pure black and white facsimile replicas of the original copy and hence they can be used with the present circuits although the preferred printer, as previously mentioned, is the one disclosed in the Salaman et al. application for "Facsimile Scanner-Printer" previously mentioned.

The control arrangement for the printer 11 will now be described. The control functions which are required provide for the start and stop of the drive means for transporting the paper surface through the scanner printer 11 at both the transmitting and receiving stations and the synchronous and in-phase starts of the horizontal drive of the scanner at the transmitter and receiver. The printer thus comprises a paper transport having driven rollers 71, 71' which form nips respectively with the smooth surface of platens 72, 73 for positive control of the paper on the input and output sides of a print stylus 74. The stylus 74 is preferably a conductive metal rod of diameter 0.020 inches or less mounted on the horizontal belt 75 which is threaded on horizontally spaced pulleys 76. The drive of the rollers 71, 71' is under control of the vertical drive motor power switch 14 and the drive of the pulleys 76 is under control of the horizontal motor control 12. The stylus 74 makes electrical contact by means of a brush to a horizontal bar 77 which is connected to the facsimile signal line 64. The photoelectric analog facsimile signal on the output line 21 is derived from a scanner running in the same path as the stylus 74 and as disclosed in the aforementioned application for "-Facsimile Scanner-Printer" of Salaman et al., the photoelectric-sensing means can be contained in the same head as the stylus 74. Alternatively the photoelectric sensing head can scan in a separate head following the same path of movement and synchronized therewith.

In accordance with the process of electrojunction thermographic printing disclosed and claimed in the application of Salaman and Taylor, Ser. No. 579,772, filed Sept. 15, 1966 now U.S. Pat. No. 3,441,940 dated Apr. 29, 1969 entitled "-Process for Electro-Junction Thermography" a composite sheet is passed through the printer 11 comprising a thin conductive metal foil 78, a printing sheet of paper 79 and an intermediate coating (not shown) on the sheet 78 of a thermal transfer substance. Alternatively, the metal foil can be stationary in which case a heat-sensitive transfer sheet is fed through the printer with the paper (as described with reference to FIG. 5 of said application for "Process for Electro-Junction Thermography"). The metal foil 78 makes electrical contact with the metallic platens 72 and 73 as it passes under the pressure of the rollers 71, 71' and the stylus 74 makes an electric junction at its tip with the conductive surface of the foil 78. In order that this junction may make good contact with the foil surface 78 a backup platen 81 extends across the entire width of the scan for the stylus 74. As the pulleys 76 turn scanning the stylus 74 along the width of the foil sheet 78, the electrical signals on line 64 produce localized heating due to the resistance of the junction between the tip of the stylus 74 and the electrically conductive surface of the foil 78 so that the thermographic substance between the foil 78 and the paper 79 is transferred to the paper thereby producing the desired image.

For control purposes the entrance switch 82 provides a signal on line 15 upon the entrance of a sheet into the vertical drive mechanism provided by roller 71 and an exit switch 83 provides a signal on line 16 whenever paper is present under the exit roller 71'. The vertical and horizontal drives 12 and 14 are controlled by the output of the AND 88. The inverter 85 is such that the closure of switch 83 producing signal on line 16 does not produce an output signal which will reset flip-flops 84 and 87 but upon the opening of the switch 83 the signal on line 16 after passing through inverter 85 will reset the flip-flops 84 and 87. The output of the inverter 85 is also applied to reset a flip-flop 86 which is set by the output of the AND 88. The inputs to the AND 88 come from the flip-flop 84 and from a line 89 that is connected to the send-receive switch 80 actuated by send-receive switch actuator 10 and which is energized when the switch 80 is in the SEND position, as indicated by (+) or in the receive position by a flip-flop 87 when a carrier present signal appears on line 91. Thus the output of AND 88 occurs when the equipment is switched to the SEND condition and switch 82 is closed to produce a signal on line 15 or in the receive condition when switch 82 is closed and a signal appears on the presence of received carrier line 91 derived from the detector 56.

Flip-flop 86 is connected when set to start the horizontal drive 12 and to supply an input through the send terminal S of a switch 59 to AND 93 which when enabled passes the carrier signal from line 36 to the SEND terminal of send-receive switch 30. When reset, flip-flop 86 stops the horizontal motor 12. The horizontal motor and its control circuits 12 include suitable indexing and braking mechanism (not shown) so that once the stop signal is applied the horizontal drive stops at an index position so that the sending and receiving equipment will start from the same index position for each transmission.

The scanner-printer mechanism 11 includes a foil-paper feed 94 which is operated 90 actuated by send-receive switch actuator 10 to eject the composite foil-paper assembly 78, 79 into the entrance nip under roller 71 whenever the switch 10 is depressed to RECEIVE position to prepare the equipment for the receipt of a message.

The control sequence will now be described. At the transmitter station an ordinary telephone call is placed and the person called is informed that a facsimile message is to be transmitted. At each station the telephone receiver earpiece is placed in the appropriate coil location. At the sending station the telephone receiver earpiece is placed in the coil 39 and at the receiving station the telephone earpiece is placed in the coil 51 as indicated. The receiving station places the send-receive switch 10 in the RECEIVE position and the sending station places the send-receive switch 10 in the SEND position. At the sending station the copy to be transmitted is inserted into the entrance nip under the roll 71 which drives the copy past the scan line position to be scanned by the photoelectric scanner, not shown. The drive of roller 71 starts with the closure of switch 82 to produce a signal on line 15 which sets flip-flop 84 and starts the vertical and horizontal drive motors via AND 88. The same signal also enables AND 93 so that the carrier signal on line 36 is transmitted to the telephone line. Transmission continues until the paper sheet is driven past both switches 82 and 83, the opening of switch 93 producing the signal on line 16 which when inverted in inverter 85 acts to reset flip-flops 84 and 86 stopping both the vertical and horizontal motor drives. As previously indicated the horizontal motor drive stops at an indexed position.

At the receiving station the actuation of the switch 90 to the receive made operates the paper feed 94 to start paper into the input nip of roller 71. Switch 82 when closed by the entrance of a sheet produces an output on line 15 that sets flip-flop 84. Nothing further happens at the receiving station until carrier detection occurs generating a signal on line 91 which passes through flip-flop 87, and AND 88 to set flip-flop 86 and start the horizontal and vertical motor drives 12 and 14. The occurrence of signal on line 16 from switch 83 does not produce any action at the start of the receiving sequence. Both receiver motor drives continue to run until the paper combination 78, 79 passes the switch 83 opening the circuit and removing the signal on line 16 which, through the inverter 85, stops both the vertical and horizontal drives with the horizontal drive stopped in an index position. The loss of carrier detection on line 91 does not affect the synchronized operation of the drives. Synchronism is thus maintained throughout a transmission and an indexed starting position is established for the next transmission whenever a given transmission is finished.

Although the system has been disclosed with reference to a particular printer-scanner mechanism and a particular telephone coupling arrangement it will be appreciated that the features of the invention are of general utility and not confined to the particular printer and coupling mechanisms shown. In particular, the binary information transmittal of only black and white information may be employed with other types of printers including those which have some grey scale capabilities since many such printers actually produce only black and white information if fed with a true binary signal. Likewise, certain features of the invention do not depend upon magnetic coupling to the telephone handset and as to such features use of the more conventional acoustic coupling is within the scope of the invention. The invention is not to be considered therefor to be limited to the details of the present disclosed embodiment but only by the scope of the appended claims.

For the purpose of this disclosure the disclosures of the copending applications referenced herein are hereby incorporated by reference.

We claim:

1. In apparatus for use in the transmission and reception of facsimile copy of documents and similar materials which can be systematically scanned photoelectrically to obtain an electrical signal with provision for synchronization between similar remote stations, the improvement which permits increased transmission rates when said stations are connected over a narrow band channel such as an ordinary voice telephone line characterized by:

quantizing means for converting the photoelectric scan signal into a binary signal having two levels which respectively represent in continuous time correspondence the black and white areas on a document as scanned for transmission by one of said stations, clocking means for clocking said binary signal at a clock rate approximately twice the bandwidth of said channel to produce a corresponding clocked binary signal, means for processing said clocked binary signal into a partial response signal having at least three detectable levels for transmission through said channel at a bit rate approximately twice that of conventional binary-transmission systems where the bit rate is approximately equal to the channel bandwidth, means for modulating a carrier frequency suitable for transmission over said narrow band channel with said partial response signal, means for demodulating a modulated carrier wave received from one of said stations over said channel to recover the modulation signal on said carrier wave, means for partial response decoding said modulation signal to obtain a replica of said binary signal, means for printing a facsimile copy in response to said replica of said binary signal, and means adapted to couple said stations to a voice telephone line either for transmitting modulated signals obtained by scanning a document at the station or for receiving said modulated carrier wave from a remote similar station to print a facsimile copy of a document scanned for transmission at said remote station.

2. Apparatus according to claim 1 in which said means for processing said clocked binary signal into a partial response signal is a filter means.

3. Apparatus according to claim 2 in which said means for modulating a carrier frequency includes a carrier oscillator having a frequency near the upper limit of the pass band of said narrow band channel, an amplitude modulator for modulating said carrier with said partial response signal; and a vestigial sideband filter for band-limiting the output of said modulator; said carrier oscillator, modulator and vestigial sideband filter producing a frequency inverted and shifted signal corresponding to said partial response signal modified to utilize substantially the whole bandwidth of said channel.

4. Apparatus according to claim 3 in which said coupling means comprises magnetic couplings to the earpiece of a telephone handset and includes two coupling coil means the coils of which are positioned to encircle the internal coil of said earpiece and be substantially coplanar therewith, the coil means used for coupling received signals from said telephone line including at least two coils connecting for hum-bucking operation.

5. Apparatus according to claim 2 in which said clocking means includes means for producing a clocked binary signal which changes state for bits of one of said levels and does not change state for bits of the other level.

6. Apparatus according to claim 5 in which said means for processing said clocked binary signal comprises:

a. a premodulation low-pass filter for converting said clocked binary signal into said partial response signal,
b. a carrier oscillator of frequency near the upper frequency limit of said channel,
c. a baseband balanced amplitude modulator for modulating said carrier with said partial response signal,
d. a vestigial sideband filter for band limiting the output of said modulator, and
e. a transmitting transversal filter for said vestigial sideband signal, said filters and modulator producing a frequency shifted and inverted signal corresponding to said clocked binary signal modified to utilize substantially the whole bandwidth of said channel and compensated for the amplitude and phase distortion introduced by the transfer function of the equipment through which the signal passes.

7. Apparatus according to claim 6 and including a receiving transversal filter having a transfer function to compensate for the amplitude and phase distortion introduced by said channel on the vestigial sideband signal received from a remote similar unit, and means for passing the modulated carrier coupled from said channel to said receiving transversal filter.

8. Apparatus according to claim 6 and including means for phase locking said precision local oscillator with the bit rate detected from the modulated carrier received from a remote similar unit.

9. Apparatus according to claim 8 in which said scanning means and said printer include:

a. means for relatively driving a sheet at a uniform rate transverse to a scanning line position;
b. motor means for driving a scanning head repetitively across said sheet at said scan line position;
c. means for deriving a submultiple frequency from said precision local oscillator; and
d. means for controlling the speed of said motor means in accordance with said submultiple frequency.

10. Apparatus according to claim 2 including:

a. means for phase locking said precision local oscillator with the bit rate detected from the modulated carrier received from a remote similar unit;
b. means in said scanning means and said printer for relatively driving a sheet at a uniform rate transverse to a scanning line position;
c. motor means for driving a scanning head repetitively across said sheet at said scan line position;
d. means for deriving a submultiple frequency from said precision local oscillator; and
e. means for controlling the speed of said motor means in accordance with said submultiple frequency.

* * * * *